United States Patent
Gerardin et al.

(10) Patent No.: US 9,683,917 B2
(45) Date of Patent: Jun. 20, 2017

(54) METHOD OF DETERMINING SIDEWALL AGGRESSION PERFORMANCE PARAMETERS

(75) Inventors: Olivier Gerardin, Simpsonville, SC (US); Craig M. Jurs, Greenville, SC (US)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 919 days.

(21) Appl. No.: 13/511,708

(22) PCT Filed: Oct. 21, 2010

(86) PCT No.: PCT/US2010/053537
§ 371 (c)(1),
(2), (4) Date: May 24, 2012

(87) PCT Pub. No.: WO2011/047075
PCT Pub. Date: Apr. 21, 2011

(65) Prior Publication Data
US 2012/0245859 A1   Sep. 27, 2012

(51) Int. Cl.
G01M 17/02   (2006.01)
(52) U.S. Cl.
CPC .................. *G01M 17/022* (2013.01)
(58) Field of Classification Search
CPC .................................. G01M 17/022
USPC ............................................. 702/34
See application file for complete search history.

(56) References Cited

U.S. PATENT DOCUMENTS

| 3,406,566 | A | * | 10/1968 | Livingston | G01N 3/40 73/81 |
| 5,245,867 | A | | 9/1993 | Sube et al. | |
| 5,777,219 | A | | 7/1998 | Popio | |
| 6,729,179 | B2 | * | 5/2004 | Crema | G01M 17/022 73/146 |
| 2001/0052259 | A1 | * | 12/2001 | Mahner | G01M 17/027 73/146 |
| 2003/0037608 | A1 | | 2/2003 | Crema et al. | |
| 2005/0081614 | A1 | | 4/2005 | Zhu | |
| 2007/0093981 | A1 | | 4/2007 | Reynolds et al. | |

(Continued)

FOREIGN PATENT DOCUMENTS

JP   8-285736 A   11/1996
JP   2006-030046 A   2/2006

OTHER PUBLICATIONS

PCT International Search Report for PCT/US2010/065724, dated Aug. 26, 2010.

(Continued)

*Primary Examiner* — Ricky Ngon
(74) *Attorney, Agent, or Firm* — Dority & Manning, P.A.

(57) ABSTRACT

A powered massaging assembly includes a handle and a massage head each having an enclosure that presents a chamber. The massage head includes a drive shaft that extends into and out of the chamber. The massage head also includes a driven massage element drivingly attached to the drive shaft and mounted outside the chamber to manipulate tissue. The enclosures include connectors rotatably attached to each other to provide a swivel joint that rotatably interconnects the handle and head.

25 Claims, 9 Drawing Sheets

(56) References Cited

U.S. PATENT DOCUMENTS

2011/0048120 A1* 3/2011 Dank .................. G01M 17/021
                                                                             73/146
2012/0193008 A1* 8/2012 Katayama ................. B60C 3/04
                                                                            152/526

OTHER PUBLICATIONS

PCT International Search Report for PCT/US2010/053537, dated Dec. 20, 2010.

* cited by examiner

METHOD OF DETERMINING SIDEWALL AGGRESSION PERFORMANCE PARAMETERS

FIELD OF THE INVENTION

The present invention relates to methods for determining sidewall aggression performance parameters that indicate the ability of a tire to resist sidewall aggression and therefore damage to the sidewall.

BACKGROUND OF THE INVENTION

While a tire tread is designed to be in contact with the ground surface and is therefore constructed from compositions intended for this purpose, the sidewalls are generally not designed to be ground contacting. Instead, the sidewalls of a tire typically include a layer of rubber material that covers certain structural elements, such as e.g., the cords of a tire carcass, which extend between and through the sidewalls of the tire. This rubber material is conventionally created from a composition not designed for ground contact but rather for flexibility so that the sidewalls can withstand the repeated flexing of the tire that occurs as it rotates through the contact patch. In addition, this sidewall rubber is typically not as thick as the tread rubber. As such, the sidewalls generally have less resistance than the tread to puncture damage that can occur when the tire is contacted with another object in or along the ground surface.

Certain tires are intended for more rugged applications where encounters with objects that may puncture or otherwise damage the sidewall can be frequent. For example, for recreational and emergency off-road applications, tires may be subjected to contact with rocks, trees, and other objects that can puncture and deflate a pneumatic tire. Of course, for such tires it is generally desirable to increase their capability to resist sidewall aggression—i.e., to increase their resistance to puncture, rupture, or other sidewall damaging events caused by contact during tire use. Features can be added at, for example, the shoulder region of the tire to help resist certain sidewall aggressions. More particularly, lugs or blocks can be added about the shoulder to protect the sidewall from shoulder aggression by remaining between a dangerous object and the sidewall as the tire rolls over the object.

While testing tires under actual conditions such as off road environments can provide important information about a tire's ability to resist sidewall aggression, the repeatability of such testing in harsh conditions so that different tires may be compared accurately is very difficult. Even operating the same vehicle over the same path of rocky terrain does not ensure that the tires will be subjected to the same sidewall aggression events on each pass. Rocks and other debris can be moved or affected by each pass of the vehicle, thereby ensuring that different conditions will be presented even if the vehicle can be operated along the same path for each pass. A rock that does not present a sharp point during one pass may be repositioned in a manner that becomes more of a sidewall damage threat for the next pass or vice versa. As such, it can be difficult to compare different tires with such testing.

Accordingly, specific methods for testing a tire's ability to resist damage from sidewall aggression are desirable. More particularly, methods for determining particular performance parameters that characterize a tires resistance to sidewall aggression under conditions that can be repeated among multiple tests would be very useful. These and other useful aspects of the present invention will be apparent from the description that follows.

SUMMARY OF THE INVENTION

Aspects and advantages of the invention will be set forth in part in the following description, or may be obvious from the description, or may be learned through practice of the invention.

In general, aspects of the present invention concern methods for evaluating tire resistance to sidewall aggression. In accordance with such methods, one or more test tires may be subjected to contact with a damage tool. The height and depth of the damage tool can be selectively varied by adjusting the respective vertical and lateral dimensions of the damage tool relative to a tire sidewall surface.

In a more particular exemplary embodiment, a method for testing the resistance of a tire to sidewall damage involves subjecting one or more test tires to contact with a damage tool. The lowest height of the damage tool at which a given type of damaging event (e.g., rupture, puncture, splitting, cutting) occurs in each test tire is measured. A first performance parameter based at least in part on the measured lowest height of the damage tool at which the given type of damaging event occurs in each test tire is calculated. Such first performance parameter provides information about a tire's ability to drive over an object while resisting sidewall damage.

In some embodiments, the measured lowest height of the damage tool at which a given type of damaging event occurs is determined for different types of tire features ($j=1, \ldots, J$), for example—lugs and voids along a tire sidewall. Characteristic dimensions $a_j$ for each different type of tire feature ($j=1, \ldots, J$) may also be determined and used in the calculation of the first performance parameter. A particular example in which the first performance parameter for the one or more test tires (T1) may be determined is in keeping with the formula $$P1_{T1} = \frac{1}{\sum_{j=1}^{J} a_j} \left[ \sum_{j=1}^{J} a_j h(T1_{j\_low}) \right],$$

where $h(T1_{j\_low})$ is the measured lowest height of the damage tool at which a given type of damaging event occurs at each type of tire feature j within the test tire (T1). Such first performance parameter also optionally may be related to a reference value, such as but not limited to a threshold value or a value similar to the first performance parameter calculated for one or more reference tires.

In another more particular exemplary embodiment, a method for testing the resistance of a tire to sidewall damage involves subjecting one or more test tires to contact with a damage tool. The depth of the damage tool at which a given type of damaging event occurs in the test tire while the damage tool is fixed at one or more predetermined heights (k) is measured. A second performance parameter based at least in part on the measured depth of the damage tool at which the given type of damaging event occurs in the test tire (T1) at each of the one or more predetermined heights (k) is then determined. Such second performance parameter provides information about the strength of a tire sidewall to resist damage from protruding objects encountered along the sidewall.

In some embodiments, the measured depths of the damage tool at which a given type of damaging event occurs is determined for different types of tire features (j=1, ..., J), for example—lugs and voids along a tire sidewall. Characteristic dimensions $a_j$ for each different type of tire feature (j=1, ..., J) may also be determined and used in the calculation of the second performance parameter. A particular example in which the second performance parameter (P2) for the one or more test tires (T1) may be determined is in keeping with the formula $$P2_{T1} = \frac{1}{\sum_{j=1}^{J} a_j} \left[ \sum_{j=1}^{J} \frac{a_j}{K} \left[ \sum_{k=1}^{K} d(T1_{j\_k}) \right] \right],$$

where $d(T1_{j\_k})$ is the measured depth of the damage tool at which the given type of damaging event occurs at each of the one or more predetermined heights (k=1, ..., K) and for each type of tire feature (j=1, ..., J) within the test tire (T1). Such second performance parameter also optionally may be related to a reference value, such as but not limited to a threshold value or a value similar to the first performance parameter calculated for one or more reference tires.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
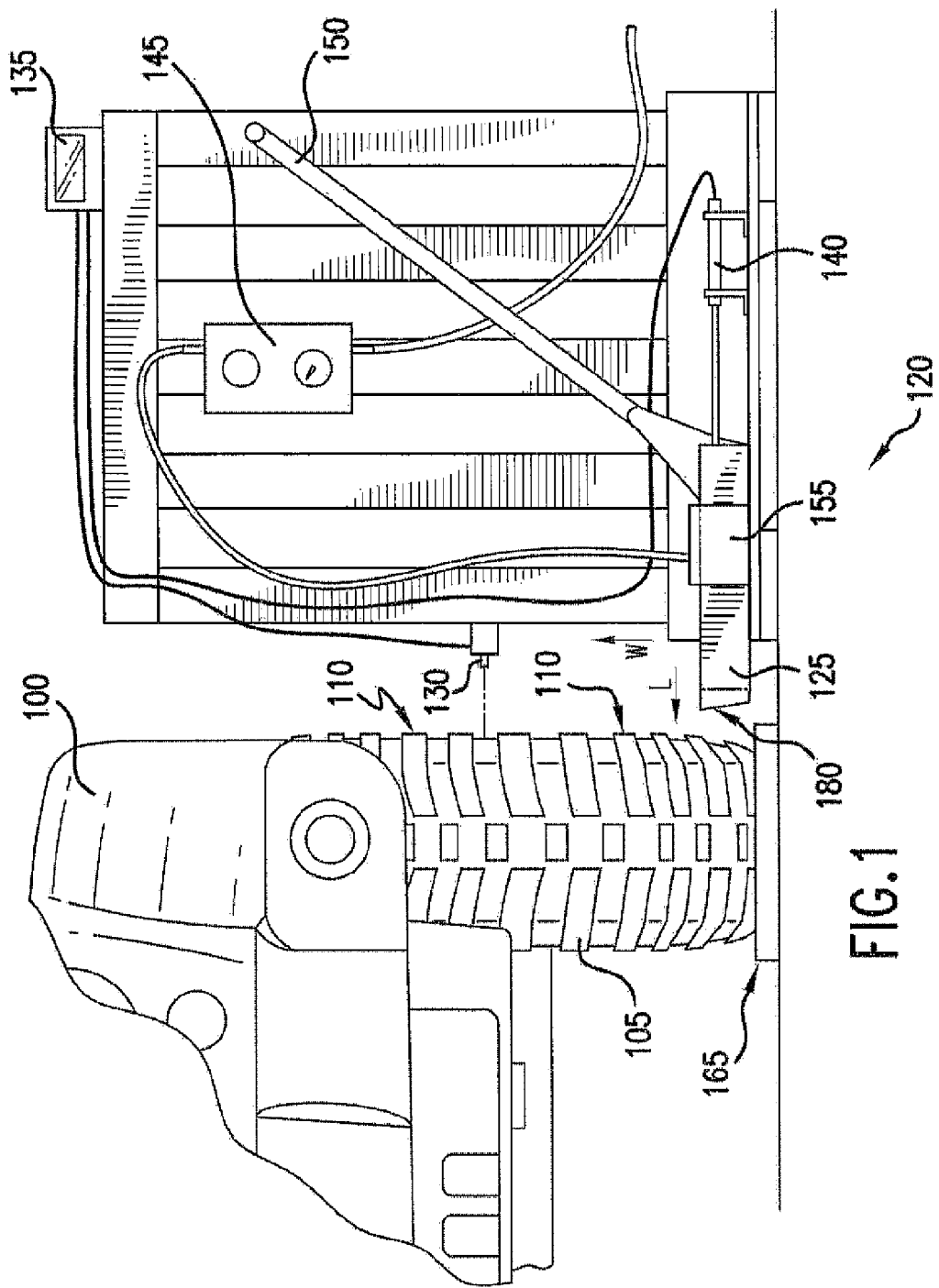
FIG. 1 illustrates an elevation view of an exemplary embodiment of an apparatus that may be used to test the resistance of a tire to sidewall aggression while the tire is mounted on the vehicle.

The present invention relates a tire's resistance to sidewall aggression—i.e. the ability of a tire to avoid puncture, rupture, cutting, or other damage to the sidewall when contacting an object in the roadway. More particularly, the present invention relates to methods for determining sidewall aggression performance parameters that indicate the ability of a tire to resist sidewall aggression and therefore damage to the sidewall. The present invention provides for repeatability of test conditions between various tests and may also be used to provide quantitative data from such testing that can be used, for example, to compare the performance of different tires and/or further develop existing tire designs.

For purposes of describing the invention, reference now will be made in detail to embodiments and methods of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features and steps illustrated or described as part of one embodiment, can be used with another embodiment to yield a still further embodiment. Thus, it is intended that the present invention covers such modifications and variations as come within the scope of the appended claims and their equivalents.

Figure 2:
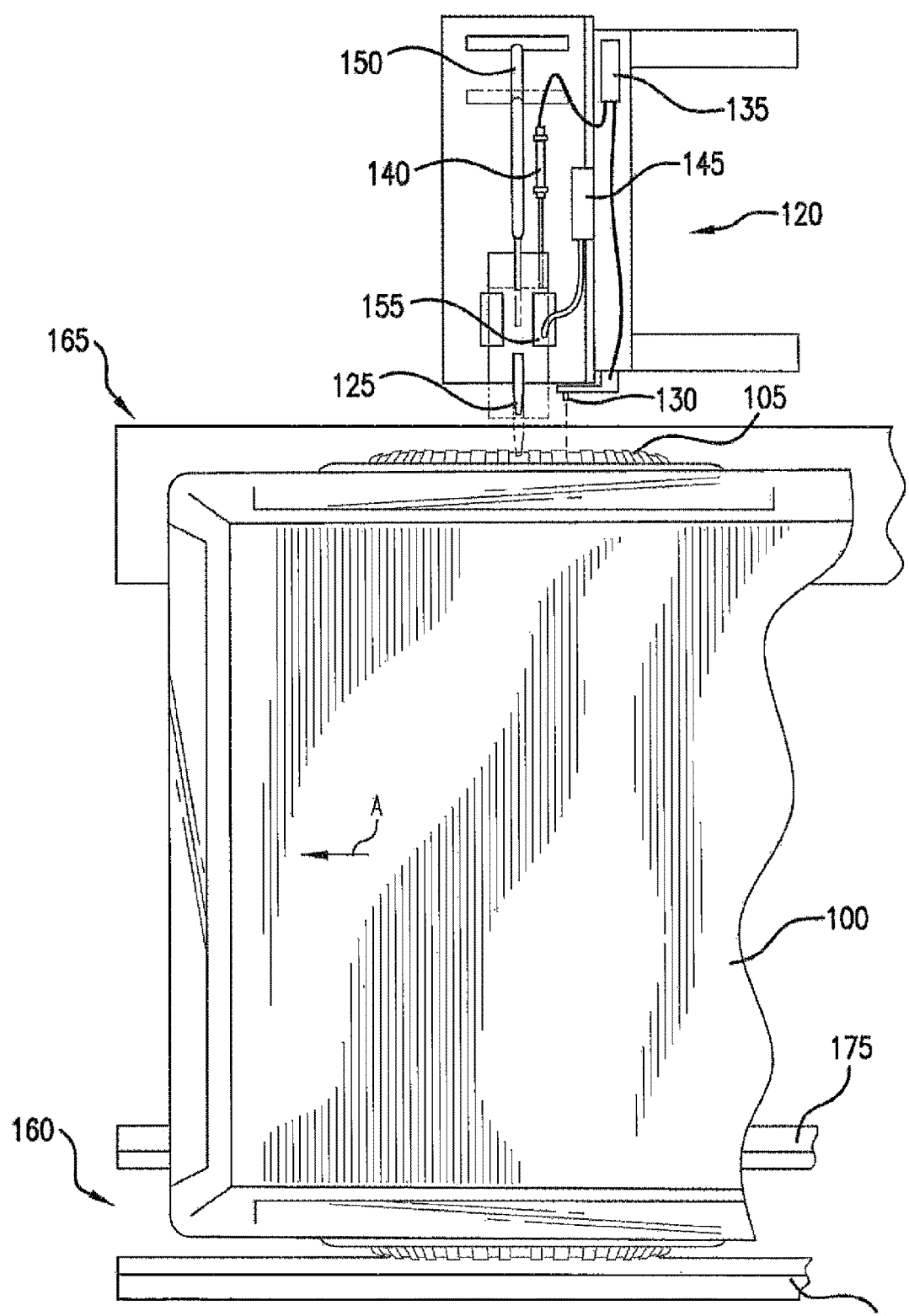
FIG. 2 illustrates a top view of the exemplary embodiment of FIG. 1.

FIGS. 1 and 2 provide elevation and top views of a test vehicle 100 onto which a tire 105 has been mounted for testing with an exemplary apparatus 120 of the present invention. Apparatus 120 allows tire 105 to be tested on the actual vehicle application intended for a particular tire. In this way, test conditions that may be unique to a particular vehicle, such as e.g., the vehicle weight and suspension, can be applied and replicated during the tests. While many types of tires may be tested using the present invention, tire 105 could be considered as an "off road" tire that is equipped with various features 110 that can help tire 105 resist damage to its sidewall 115 (FIG. 4) when contacting an object in the travel path.

Figure 3:
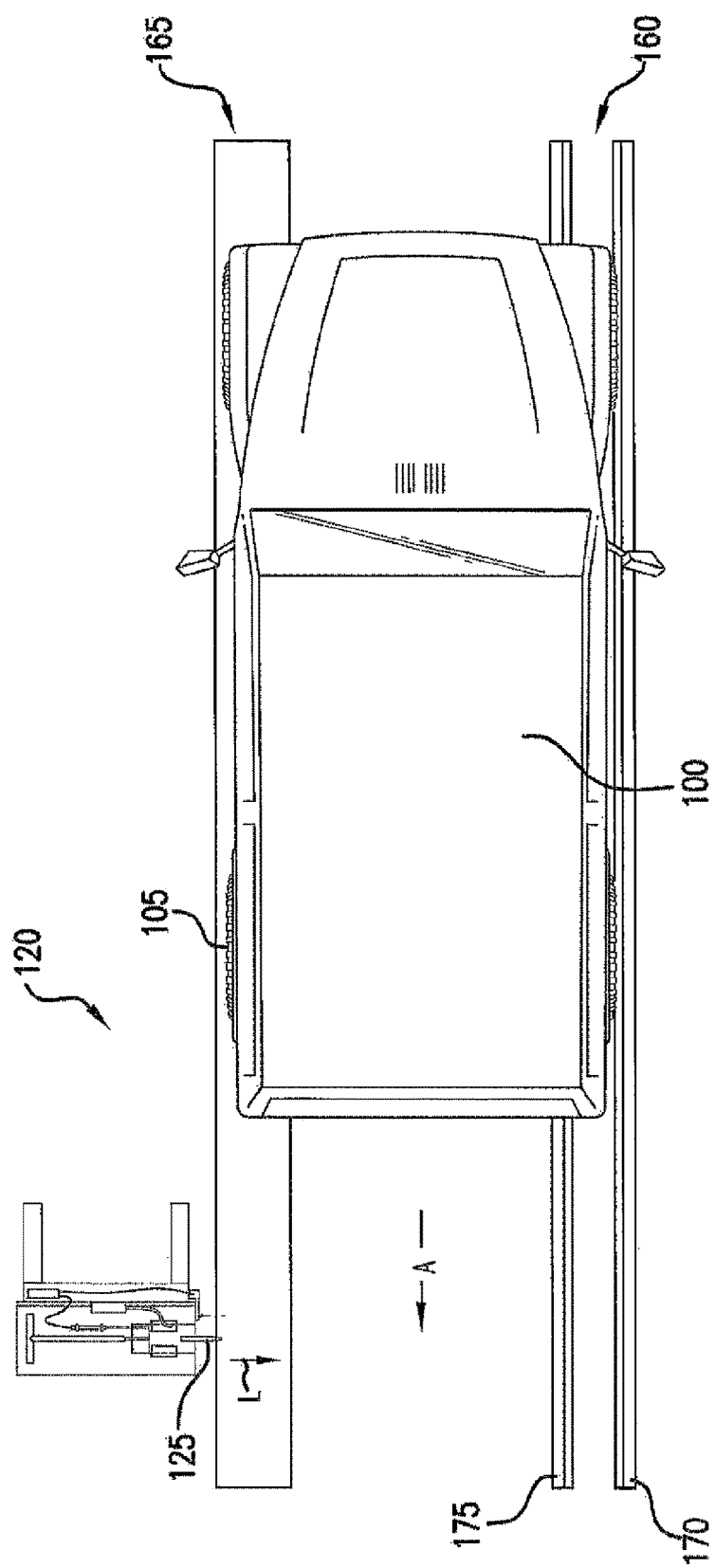
FIG. 3 illustrates a top view of a vehicle placed into the tire guide of the apparatus of FIG. 1 and in a ready position for testing.

As best seen in FIGS. 2 and 3, apparatus 120 includes a guide 160 constructed from a pair of rails 170 and 175. Guide 160 defines a longitudinal travel path for vehicle 100. As will be further described below, in order to provide consistency between tests, guide 160 operates to maintain the movement of vehicle 100 along the direction of arrow A as tire 105 is rolled into contact with a damage tool 125 on each test. Rails 170 and 175 maintain the orientation of the tires along one side of vehicle 100 opposite from the side having test tire 105. Depending upon e.g., the width of vehicle 100's tires and the distance between rails 170 and 175, the tires may rub or catch on rails 170 and 175 and thereby induce unwanted lateral (defined as perpendicular to the longitudinal travel path defined by guide 160) movement. Accordingly, rails 170 and 175 can be lubricated to help prevent or minimize such an effect. Rails 170 and 175 are provided by way of example only. Guide 160 may be constructed from other features such as raised concrete, a recess in the road or contact surface, and others.

On the opposite side from rails 170 and 175, apparatus 120 includes a tray 165 that receives two tires from vehicle 100 including test tire 105. Tray 165 serves to position tire 105 at the proper height for contact with damage tool 125. Tray 165 may also be constructed in a variety configurations including raised concrete, wood, and others. The configuration (e.g., material) chosen for tray 165 may be based on the intended surface characteristics of test tire 105, such as but not limited to friction factor and the like.

As indicated, apparatus 120 also includes a damage tool 125 that appears in the figures as a wedge-shaped device. Damage tool 125 is intended to replicate sidewall aggression—i.e. contact with features that could puncture, rupture, or otherwise damage the sidewall of tire 105. The present invention is not limited to the particular shape illustrated in the figures and other shapes may be used with apparatus 120. Regardless, the consistent application of the same shape for damage tool 125 allows for accurate comparison between tests.

As indicated by arrow L in FIG. 1, damage tool 125 can be advanced along this lateral direction and into the longitudinal travel path defined by guide 160. More particularly, the lateral position of damage tool 125 relative to the predetermined path for tire 105 can be selected by moving damage tool 125 within rails 155 using handle 150. A locking device (not shown) can be provided to fix the position of damage tool 125 once a lateral position has been selected. For example, to selectively fix the position of damage tool 125, rails 155 could include mechanical fasteners, a rack and pinion, or other mechanisms that hold tool 125 in place as tire 105 makes contact. Similarly, the height of damage tool 125 relative to tire 105 can also be selected by movement along the direction of arrow W, and a locking device (not shown) can also be provided to fix the height of damage tool 125 once selected.

Even with guides 160 and lubrication of rails 170 and 175, the lateral position of vehicle 100 within guides 160 may vary as vehicle 100 moves along the longitudinal travel path defined by guides 160. In a manner to be more fully described, damage tool 125 will be incrementally advanced into the longitudinal travel path during testing of tire 105. For purposes of comparing test results between tires, it is desirable to know the position of tool 125 relative to tire 105. More particularly, it is desirable to know the actual amount by which damage tool 125 projects into the path of tire 105 so that different tests can be accurately compared.

Accordingly, referring specifically to FIG. 1, apparatus 120 includes a sensing device 130 that determines the lateral movement of vehicle 100 as it moves along the longitudinal travel path. For example, in one exemplary embodiment, sensing device 130 includes a laser that is reflected off the vehicle by placing a reflector on the wheel hub. As vehicle 100 passes by, light is reflected and changes in the reflecting intensity can be used to determine whether vehicle 100 has shifted laterally i.e. towards or away from sensor 130. Position sensor 140 provides information about the location of damage tool 125. Therefore, by calibrating position sensor 140 and sensing device 130 and using the information provided by sensor 130 to adjust for lateral movement, the actual amount by which damage tool 125 is projected into the path of tire 105 can be determined even though vehicle 100 may drift along the lateral direction as it moves along the longitudinal travel path provided by guide 160. This positional information (i.e. depth) for damage tool 125 allows for a more accurate comparison of results between various tests despite variations in the lateral movement of vehicle 100 during testing.

For example, in order to set up apparatus 120 for testing, tire 105 is positioned immediately adjacent to damage tool 125. Damage tool 125 is then positioned laterally and vertically to a position where the tip 180 (FIG. 1) of tool 125 makes contact with the widest part of tire 105 such as e.g., the equator along the sidewall 115. This position is defined as the "zero" for tool 125 and all incremental movements of tool 125 along lateral direction L are measured with reference to this starting point. While tire 105 is in this same position, sensor 130 also provides a reading that is defined as the zero point for the lateral position of tire 105. It should be appreciated that the widest part of the tire 105 (e.g., the equator) is only one example of a reference location for determining relative placement of the tool 125. The location of tool 125 in lateral, vertical or other directions may be obtained relative to any particular reference location(s) established during a test.

Accordingly, during testing, vehicle 100 will pass sensor 130. Any lateral movement detected by sensor 130 will be used in to determine the "true" amount by which tool 125 is projecting into the path of tire 110. If during a given test run, for example, damage tool 125 has been laterally advanced by 5 mm from its "zero" position, but sensor 130 records lateral movement of tire 105 towards the sensor of 2 mm, then the actual projection of tool 125 into the tire path is only 3 mm. This adjusting for the lateral movement of vehicle 100 is performed constantly as vehicle 100 is moved down the longitudinal travel path defined by guide 160.

An exemplary method for use with apparatus 120 will now be described beginning with FIG. 3. A vehicle 100 of choice is placed onto apparatus 120 with a selected test tire 105 mounted on the vehicle and positioned upon tray 165. Wheels on the opposite side of vehicle 100 from test tire 105 are placed into guide 160 and, more specifically, between rails 170 and 175.

After calibration and zeroing of damage tool 125 and sensor 130 as previously described, damage tool 125 is placed at is lowest height. Knowing the "zero" of damage tool 125 as previously described, tool 125 is now advanced laterally along the direction of arrow L into the longitudinal travel path by a chosen incremental amount, and the lateral and vertical position of tool 125 is then fixed or locked in preparation for contact with tire 105 as vehicle 100 passes by. The lateral position and height of damage tool 125 is recorded.

Vehicle 100 is then backed in the direction of arrow A along the longitudinal travel path defined by guide 160. As tire 105 passes sensor 130, display 135 indicates the amount by and which damage tool 125 extends into the path of tire 105. For example, display 135 may indicate that damage tool 125 extends 5 mm into the path of tire 105. In the event vehicle 100 drifts laterally, sensor 130 determines the amount of this drift and an adjustment is automatically made so that display 135 provides the actual amount by which tool 125 projects into the path of tire 105 at any given point during the test.

In the event tire 105 is not ruptured or punctured from contact with damage tool 125 during a given pass, vehicle 100 is then returned to its original position (as shown in FIG. 3). Damage tool 125 is now advanced by a predetermined amount along the lateral direction of arrow L so as to increase the amount by which damage tool 125 projects into the path of tire 105. This position is recorded and vehicle 100 is again backed along the direction of the longitudinal travel path so that tire 105 is again rolled into contact with damage tool 125 and then past damage tool 125. As tire 105 passes, sensor 130 again determines whether there is any movement of vehicle 100 along the lateral direction so that the actual amount of projection of damage tool 125 into the path of tire 105 may be indicated from display 135.

If the sidewall of tire 105 is not damaged by damage tool 125, the process of advancing damage tool 125 laterally by an incremental amount and backing vehicle 100 along guide 160 is repeated. "Damage" to the sidewall as used herein includes cutting, puncturing, rupturing, splitting or otherwise damaging the sidewall of the tire. For example, the test can be operated until only one or a combination of these events occurs, whichever event(s) is selected for the test.

Figure 4:
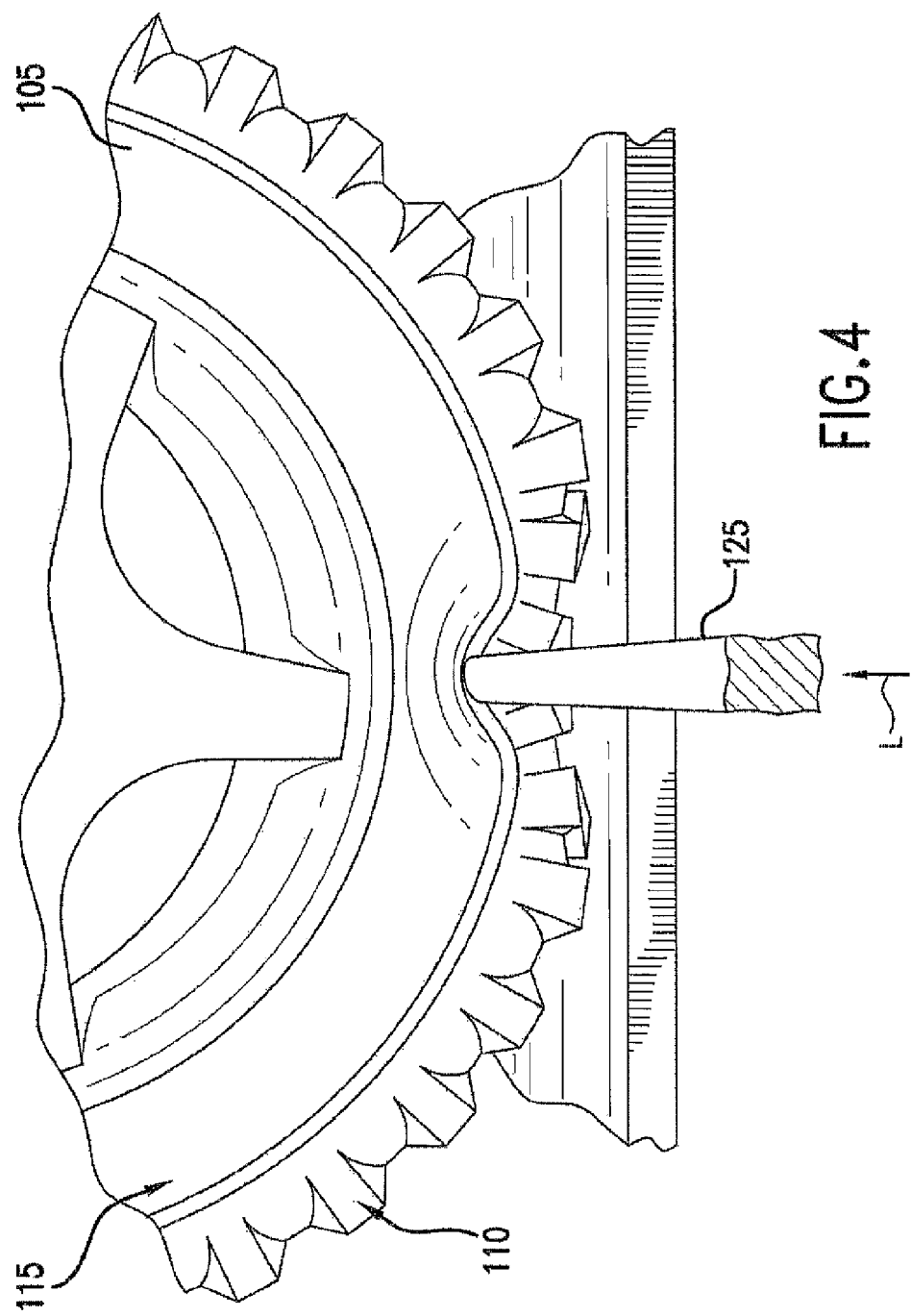
FIG. 4 illustrates a tire as it drives over an exemplary embodiment of a damage tool.

During each pass of tire 105 and lateral advancement of damage tool 125, the wedge-shaped element of tool 125 will project farther and farther into the path of tire 105. Each time tire 105 rolls into contact with tool 125, there is an opportunity for tool 125 to damage sidewall 115 of tire 105. If sidewall 115 is damaged, then the test is terminated and the lateral position (depth) and vertical position (height) of damage tool 125 at the time of such damage (e.g., a puncture) is recorded for tire 105. Alternatively, if tire 105 is not damaged as damage tool 125 is increasingly advanced laterally for each pass of vehicle 100, then tire 105 will eventually begin to either roll over damage tool 125 or slide off tool 125 without damaging sidewall 115. For example, FIG. 4 shows the deformation of tire 105 as it rolls over damage tool 125 without damage, such as e.g., a puncture, to sidewall 115. Once this condition is reached, damage tool 125 is retracted laterally back to its original zero position and the height of damage tool 125 is increased by an incremental amount. Now, the entire process of advancing damage tool 125 along lateral direction L by incremental amounts for a given height are repeated until tire 105 is either damaged or begins rolling over or sliding off damage tool 125, at which point the vertical height of tool 125 is increased and the lateral advancement process is repeated. Camera system 145 (FIGS. 1 and 2), preferably a high speed system, can be used to record any puncture of tire 105 and provide information for later study. Information provided by display 135 can also be recorded electronically for later use if desired.

Eventually, for each tire that is tested, a lateral and vertical position will be reached at which a given tire will experience damage to its sidewall 115. By repeating this test for different tires, apparatus 120 provides a valuable and repeatable test by which the resistance of different tires to sidewall aggression may be evaluated. For example, some tires may not be able to resist sidewall puncture even when damage tool 125 is set at a relatively low height and minimal projection into the tire path along lateral direction L. Conversely, other designs may be able to stand deeper projections into the tire path and at greater heights. Both tire architecture and tread design may be evaluated and developed through comparison testing. Accordingly, apparatus 120 provides a repeatable, reliable method of comparing tires of different design and manufacture for resistance to sidewall aggression.

While general reference has been made to methods of testing tires using an apparatus 120, FIGS. 5-10 present additional aspects of particular performance parameters for use in sidewall aggression evaluation for tires. In particular, methods are presented herein for determining a first exemplary performance parameter (P1) referred to herein as a "Drive Over Performance Parameter." Parameter P1 generally characterizes the ability of a tire to drive over an object while experiencing no amount or a minimum or acceptable amount of sidewall damage. Parameter P1 specifically identifies the lowest estimated sidewall height at which a tire is susceptible to a particular type of damaging event.

In addition, methods are presented herein for determining a second exemplary performance parameter (P2) referred to herein as a "sidewall Strength Performance Parameter." Parameter P2 generally characterizes the ability of a tire to deal with protrusion into the tire sidewall while experiencing no amount or a minimum or acceptable amount of sidewall damage. Parameter P2 specifically identifies the lowest estimated sidewall depth at which a tire is susceptible to a particular type of damaging event.

The introduction of the specific types of parameters P1 and P2 described herein is advantageous for several reasons. First, the realization of at least two different types of parameters to assess overall tire sidewall aggression performance provides more meaningful results for assessing tire fitness. In addition, the methods described herein account for different tire geometries by addressing how to evaluate tire sidewall fitness when different types of tire features are present along a tire sidewall (e.g., various combinations of one or more types of lugs, blocks, voids, grooves, etc.). The inventors have identified that the damage tool within a testing apparatus has the possibility to damage a tire with different severities depending on how and where it interacts with a tire sidewall (e.g., interaction at a lug versus a void). For this reason, the disclosed parameters account for such phenomenon by extrapolating the performance parameter based on an understanding of the tire geometry and the weighted probabilities of where the damage tool might happen to land along a tire sidewall.

Figure 8:
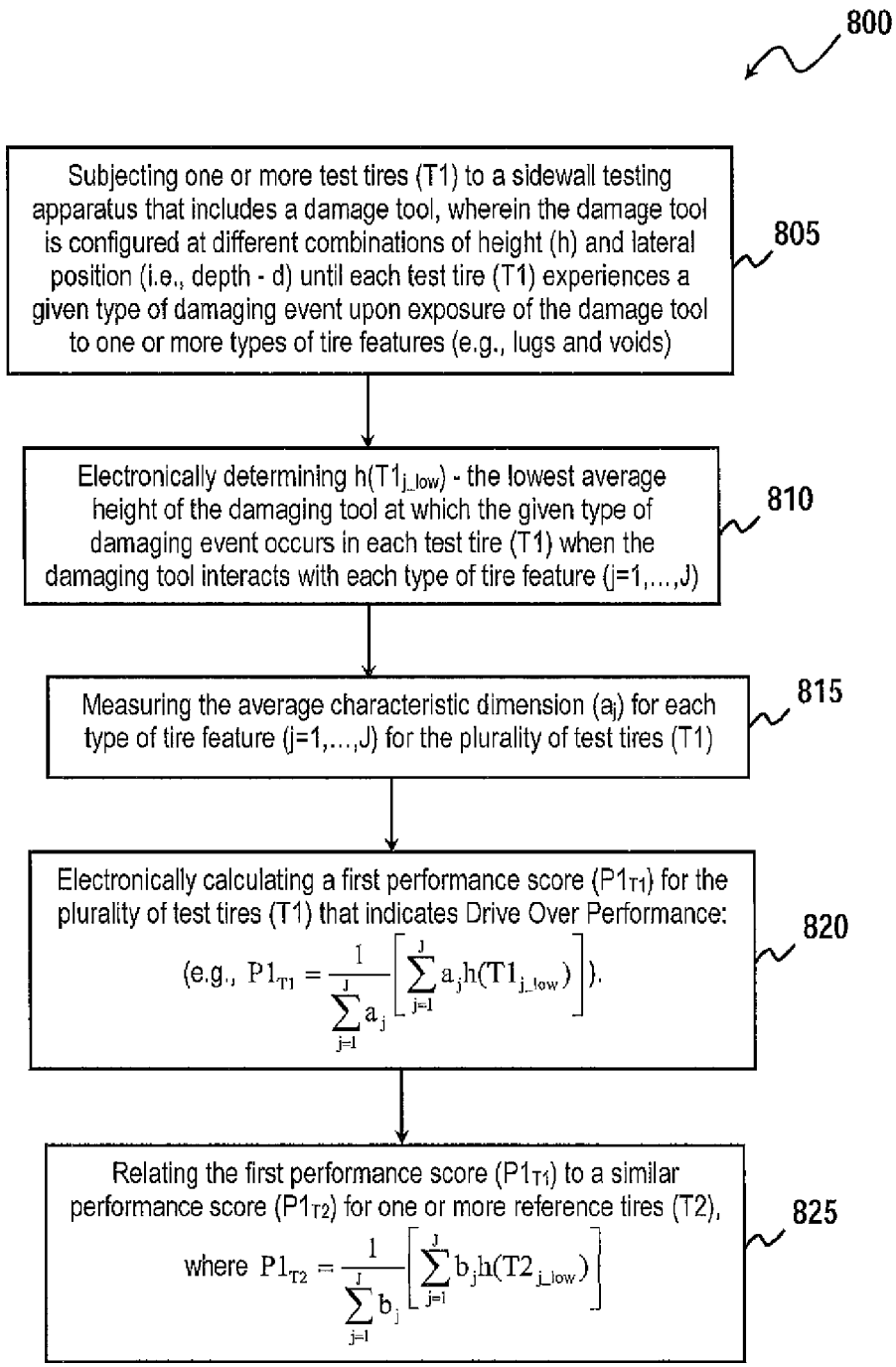
FIG. 8 provides a flow chart of exemplary steps in a method of calculating a first sidewall performance parameter (P1) for one or more test tires.

Referring now to FIG. 8, an exemplary method 800 is presented for calculating the Drive Over Performance Parameter (P1). In accordance with a first step in such method, an initial step 805 involves subjecting one or more test tires (T1) to a sidewall testing apparatus that includes a damage tool, wherein the damage tool is configured at different combinations of vertical position (i.e., height—h) and lateral position (i.e., depth—d) until each test tire (T1) experiences a given type of damaging event upon exposure of the damage tool to one or more types of tire features (e.g., lugs and voids). Ultimately, a determination is made in step 810 identifying $h(T1_{j\_low})$—the lowest average height of the damage tool at which the given type of damaging event occurs in each test tire (T1) when the damage tool interacts with each type of tire feature (j=1, . . . , J).

Figure 5:
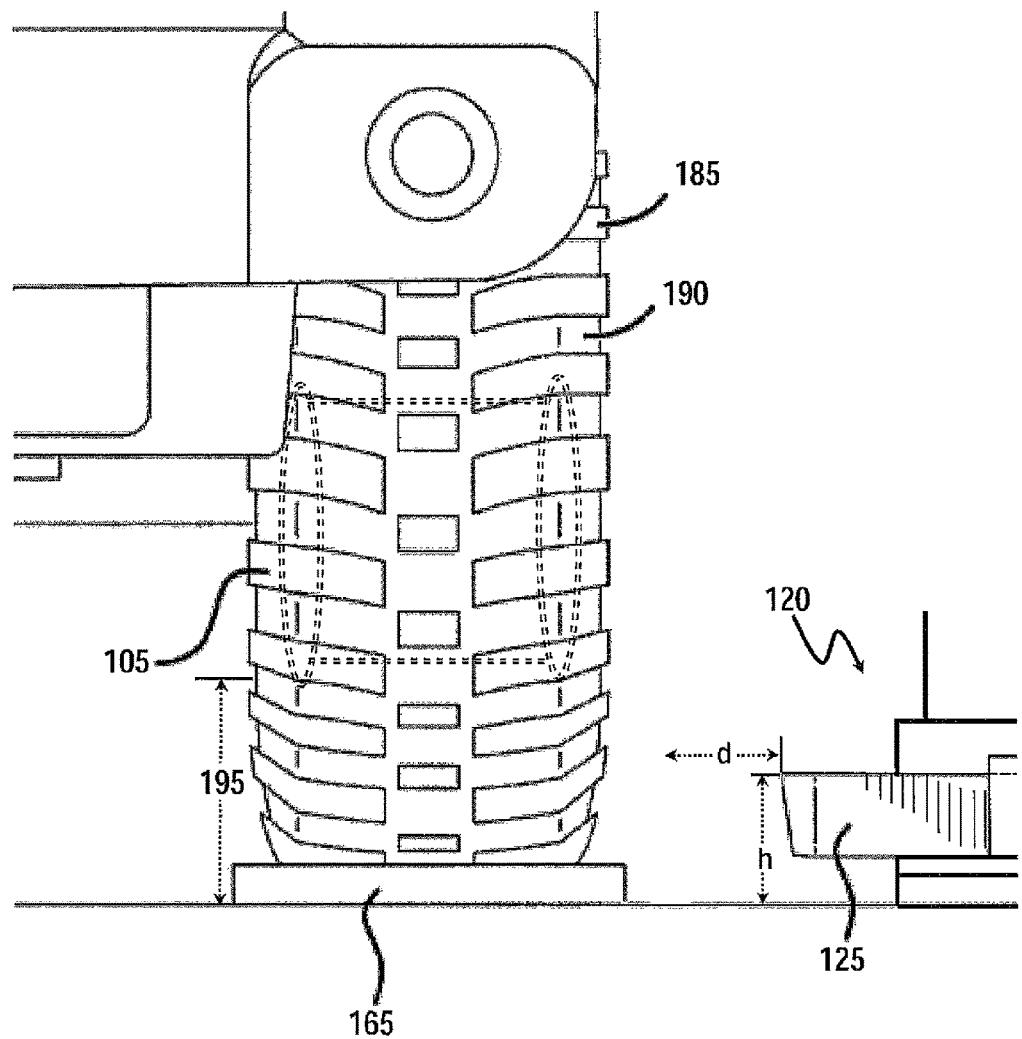
FIG. 5 illustrates a detailed view of a test tire relative to a sidewall testing apparatus.

More particular aspects of step 805 may be appreciated with reference to FIG. 5, in which a test tire 105 is subjected to sidewall testing apparatus 120, including damage tool 125. For each iteration of the test, i.e., each different combination of height and depth of damage tool 125, the relative location of damage tool 125 in both lateral and vertical dimensions is determined. Such dimensional locations can be measured relative to any reference locations. For example, as shown in FIG. 5, height (h) can be measured from a ground surface to the top edge (or other outermost location) of damage tool 125. In some embodiments, the height of the tray 165 is subtracted out from the measured height (h) value. The depth (d) can be measured from an initial depth to another varied level. For example, the damage tool 125 can be adjusted laterally inward towards the sidewall surface of tire 105 until it is just touching the surface but not exerting any force to cause protrusion into the sidewall surface. This location can be set as the initial depth, and all measured depth values (d) can be measured as respective lateral distances at which damage tool 125 protrudes into the sidewall of tire 105 from such initial depth.

The respective height (h) and depth (d) values can be determined during specific interaction at different types of tire features. For example, the methods disclosed herein may be concerned with interaction of the damage tool 125 at the location of sidewall lugs 185 as well as at the location of sidewall voids 190, realizing that different levels of damage could occur at such different types of tire features. Generally, lugs are considered to be the outermost portion of the tread design. When found along the crown portion of the tire, lugs correspond to that portion of the tread design that contacts the road surface. Voids are spaces between the lugs that allow the lugs to flex.

Referring again to steps 805 and 810, it should be appreciated that the types of damaging events may include, without limitation, puncture, rupture, splitting, cutting, occurrence of one or more of the above instances to some threshold level (e.g., a cut of at least 5 min) or other predefined damage to the sidewall. The number of test tires (T1) may vary from one test tire to many test tires. The total number of test tires (T1) is often chosen in a way that balances the preference for meaningful average performance results with the cost realization that every test tire normally experiences irreparable harm during testing. In a nonlimiting example, the total number of test tires (T1) is in a range of between about three tires and about twenty tires.

The height (h) and depth (d) of the damage tool 125 is successively varied in order to determine the lowest height (h) of the damage tool 125 at which a given type of damaging event occurs in each test tire (T1). In one example, this value can be determined by starting the damage tool at a fixed initial height (e.g., a low initial height) and gradually incrementing the depth of the damage tool to see if the damaging event occurs. If the depth is incremented to a given point and either no damage occurs to the tire sidewall or the tire begins to literally drive over the damage tool, then the height can be incremented to a next fixed level where the depth of the damage tool is again incrementally increased while the tire sidewall is observed to detect damage. This process can be repeated by gradually incrementing the height and depth of the damage tool until a damaging event occurs.

With further respect to steps 805 and 810, it should be appreciated that the process of repeatedly subjecting one or more test tires to different combinations of height and depth of a damage tool may be repeated for different types of tire features if a tire sidewall includes a total number (J) of one or more types of tire features. For example, some tire sidewalls may be outfitted with a first type of feature such as lugs (j=1) and a second type of tire feature such as voids (j=2). In another example, some tire sidewalls may be provided with a first type of lug (j=1), a first type of void (j=2), a second type of lug (j=3) and a second type of void (j=4). An unlimited number of combinations of tire features is possible along a tire sidewall. Ultimately, the resultant lowest height (h) of the damage tool at which a given damaging event occurs for a given type of tire feature j, averaged across all test tires (T1), is referred to herein as $h(T1_{j\_low})$. The $h(T1_{j\_low})$ values may be determined for all types of tire features (j=1, . . . , J).

By separately performing the disclosed sidewall aggression tests with specific interaction at each different type of tire feature, the disclosed methods can account for such variation in features across a tire sidewall. Then, the results of performance for each particular type of tire feature can be qualified by each type of feature's respective characteristic dimension (e.g., length, width, surface area, etc.) so that a global performance score for a tire accounts for the probabilities that a damage tool will interact with the various types of tire features. As such, exemplary step 815 in method 800 involves measuring the average characteristic dimension ($a_j$) for each type of tire feature (j=1, . . . , J) for the plurality of test tires (T1). For example, in a tire sidewall that includes two types of tire features, lugs (j=1) and voids (j=2), the average length of the lugs ($a_1$) and the average length of the voids ($a_2$) along a particular cross-section of the tire sidewall can be measured as part of step 815. In same embodiments, every pitch length combination is measured to assure that the aspect ratio is consistent along the entire circumference of the tire. In other embodiments, a characteristic dimension is measured only for the types of tire features which specifically interact with the damage tool in each test run. Some or all of these measured dimensions can then be used to obtain an appropriate ratio for determining the global performance scores disclosed herein.

Once the height values $h(T1_{j\_low})$ and characteristic dimension values $a_j$ for all types of tire features j=1, . . . , J are obtained per steps 805-815, a first performance score ($P1_{T1}$) that generally indicates the Drive Over Performance for a tire can be electronically calculated in step 820 for the set of one or more test tires (T1). More particularly, the first performance score ($P1_{T1}$) for the plurality of test tires (T1) can be calculated by the following equation:

$$P1_{T1} = \frac{1}{\sum_{j=1}^{J} a_j} \left[ \sum_{j=1}^{J} a_j h(T1_{j\_low}) \right]. \quad (1)$$

In some embodiments of the above technology, the above parameter $P1_{T1}$ is more meaningful when compared with a reference value. In some embodiments, such a reference value may correspond to a predetermined threshold identified as an acceptable score for P1. In other embodiments, such a reference value corresponds to a similar drive over performance parameter determined for a second set of tires including one or more reference or comparison tires. In other words, it may be useful to compare the first performance score ($P1_{T1}$) to a similar performance score ($P1_{T2}$) for one or more reference tires (T2). In such instance, similar data obtained in steps 805-815 are obtained and averaged over all reference tires T2 having characteristic dimensions $b_j$ for all j=1, . . . , J such that $P1_{T2}$ can be calculated by:

$$P1_{T2} = \frac{1}{\sum_{j=1}^{J} b_j} \left[ \sum_{j=1}^{J} b_j h(T2_{j\_low}) \right]. \quad (2)$$

In one example, $P1_{T1}$ is related to $P1_{T2}$ by calculating a global P1 value ($P1_{global}$), where $P1_{global}=\Delta P1=P1_{T1}-P1_{T2}$. In another example, $P1_{T1}$ is related to $P1_{T2}$ by considering the percentage of the above $\Delta P1$ global score. In other words, $(P1_{global})=\Delta P1/P1_{T1}=P1_{T1}-P1_{T2}/P1_{T1}$.

Figure 6:
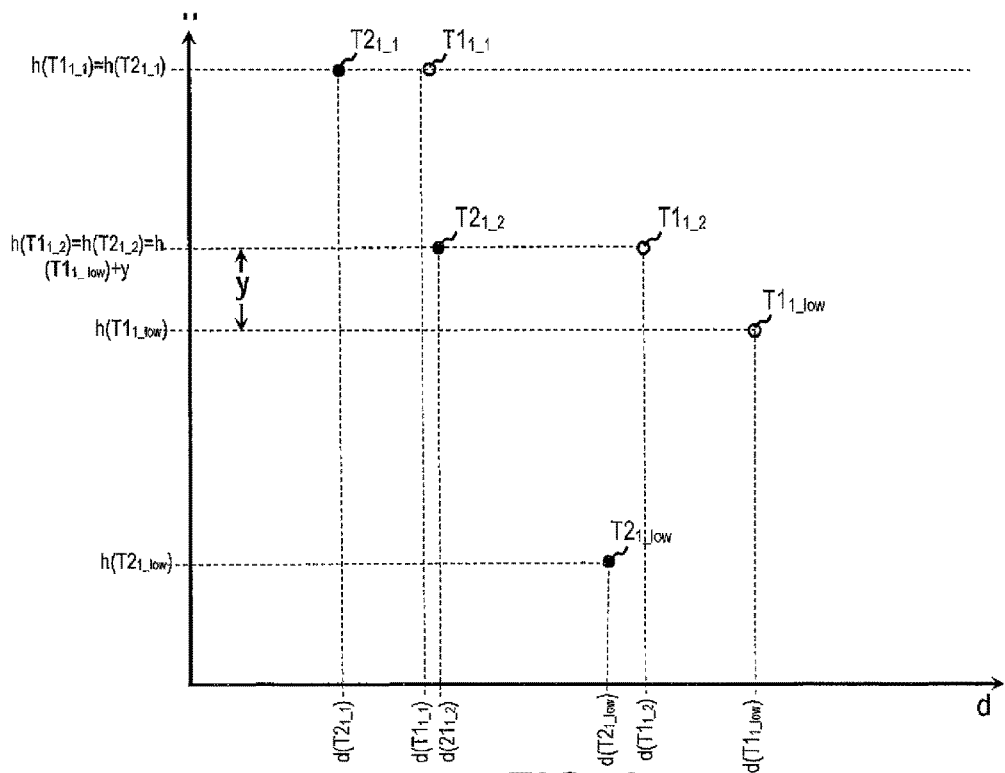
FIG. 6 illustrates a graphical representation of various height (h) versus depth (d) data points determined for different iterations of sidewall testing in which a damage tool interacts with a first type of tire sidewall feature (j=1).
Figure 7:
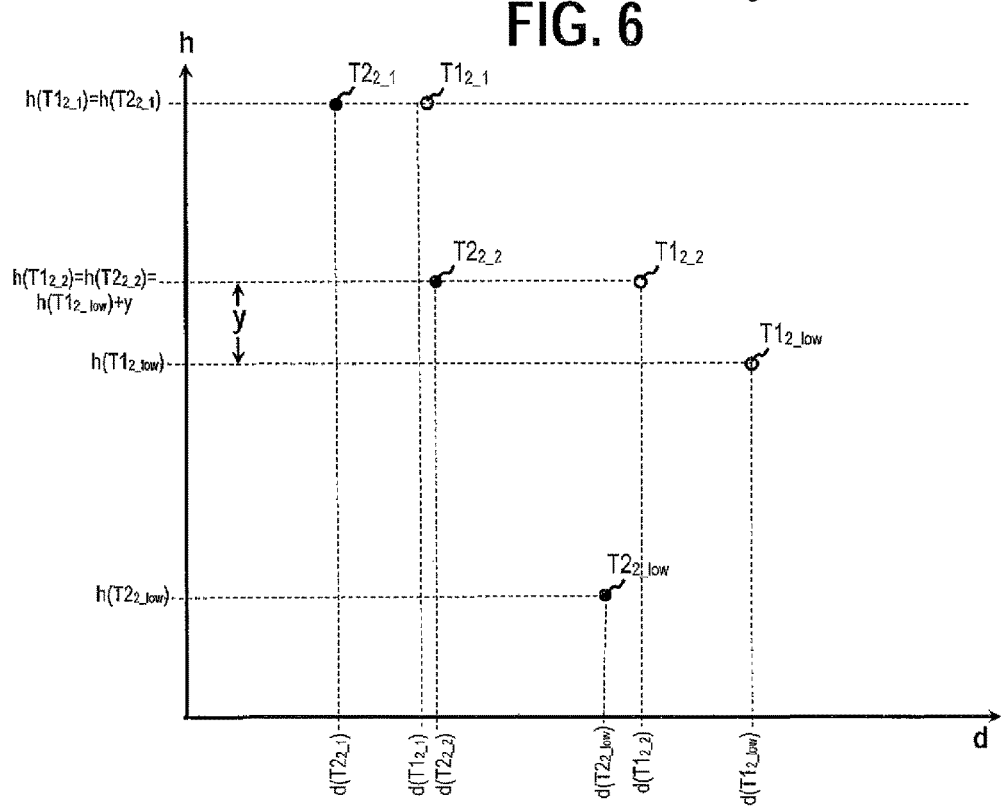
FIG. 7 illustrates a graphical representation of various height (h) versus depth (d) data points determined for different iterations of sidewall testing in which a damage tool interacts with a second type of tire sidewall feature (j=2).

An example of the measured values used to obtain the first performance parameter (P1) described relative to FIG. 8 is represented by part of the exemplary data set shown in FIGS. 6 and 7, both of which provide graphical representations of different data points associated with various sets of tires, where depth (d) is plotted along the abscissa and height (h) is plotted along the ordinate. The open circular data points in FIGS. 6 and 7 represent measurements obtained for a first set of tires, test tires (T1). The solid circular data points in FIGS. 6 and 7 represent measurements obtained for a second set of tires, reference tires (T2).

In the example of FIGS. 6 and 7, the total number of types of tire features (J) is two. FIG. 6 illustrates data points (various height and depth combinations) for sidewall damage testing performed at a first type of tire feature—lugs (j=1). In particular, the data points measured in accordance with this particular example correspond to $T1_{1\_low}$ and $T2_{1\_low}$. The height and depth at each data point are typically available via sensing device 130 and position sensor 140 associated with testing apparatus 120. However, the specific values used in determining $P1_{T1}$ and $P1_{T2}$ will be $h(T1_{1\_low})$ and $h(T2_{1\_low})$. Similarly, FIG. 7 illustrates data points for sidewall damage testing performed at a second type of tire feature—voids (j=2). In particular, the data points correspond to $T1_{2\_low}$ and $T2_{2\_low}$, and the particular values used in determining $P1_{T1}$ and $P1_{T2}$ will be $h(T1_{2\_low})$ and $h(T2_{2\_low})$. Characteristic dimensions $a_1$ and $a_2$ are also measured so that the formula for P1 for the test tires (T1) can be determined from equation (1) above as:

$$P1_{T1} = \frac{1}{\sum_{j=1}^{J} a_j} \left[ \sum_{j=1}^{J} a_j h(T1_{j\_low}) \right] = \frac{a_1 h(T1_{1\_low}) + a_2 h(T1_{2\_low})}{a_1 + a_2}.$$

Characteristic dimensions $b_1$ and $b_2$ are measured for the reference tires (T2), so that the formula for P1 for the reference tires ($P1_{T2}$) can be similarly determined from equation (2) above as:

$$P1_{T2} = \frac{1}{\sum_{j=1}^{J} b_j} \left[ \sum_{j=1}^{J} b_j h(T2_{j\_low}) \right] = \frac{b_1 h(T2_{1\_low}) + b_2 h(T2_{2\_low})}{b_1 + b_2}.$$

A meaningful result might compare the test and reference tires by determining a parameter $P1_{global} = \Delta P1 = P1_{T1} - P1_{T2}$.

Figure 9:
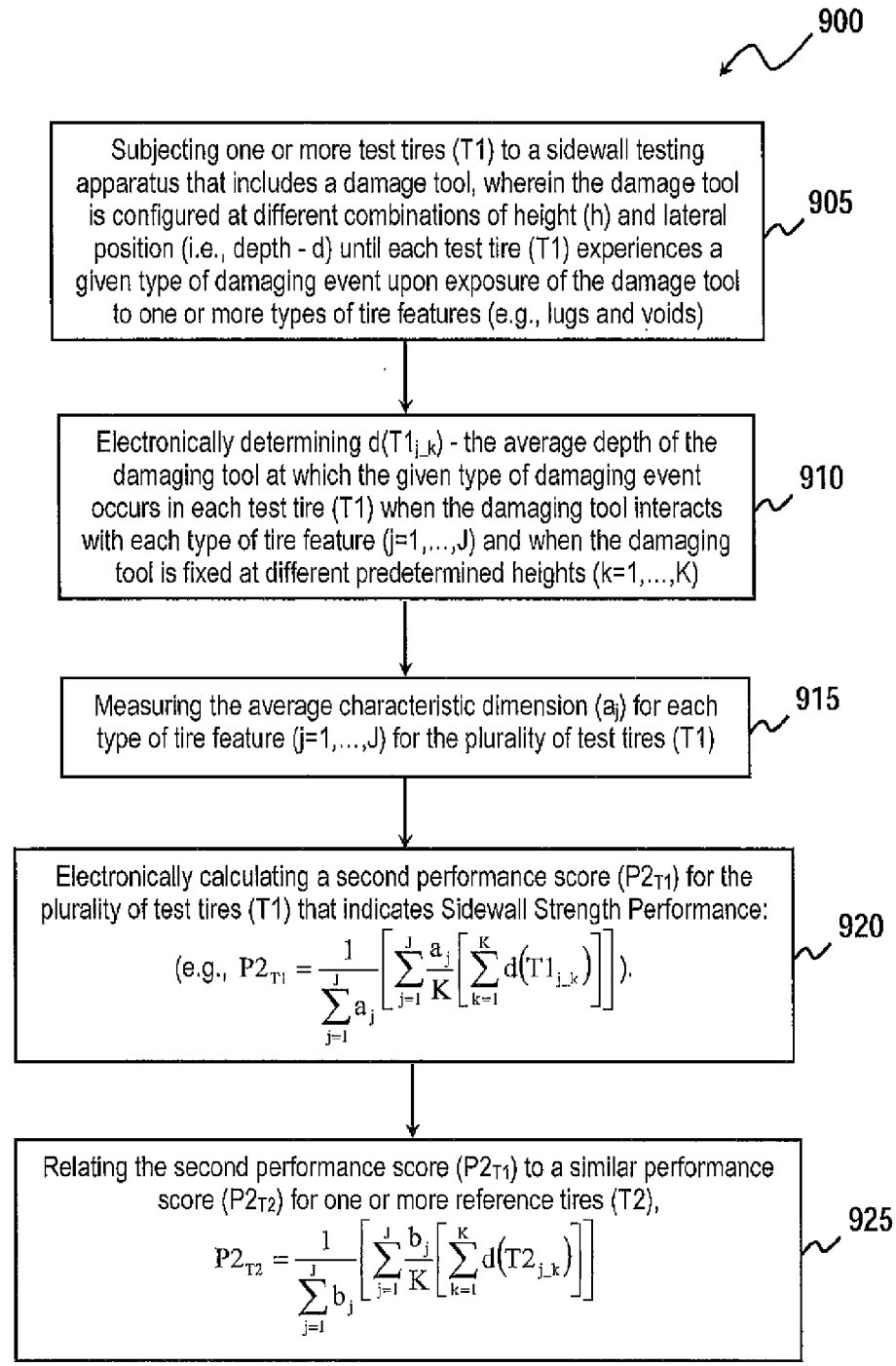
FIG. 9 provides a flow chart of exemplary steps in a method of calculating a second sidewall performance parameter (P2) for one or more test tires.

Referring now to FIG. 9, an exemplary method 900 is presented for calculating the Sidewall Strength Performance Parameter (P2). In accordance with a first step in such method, an initial step 905 involves subjecting one or more test tires (T1) to a sidewall testing apparatus that includes a damage tool. The configuration of the damage tool at different combinations of vertical position (i.e., height—h) and lateral position (i.e., depth—d) is similar to the process described above relative to method 800, and is repeated until damaging events occur at each different type of tire feature (j=1, . . . , J) in a tire sidewall.

In contrast to the Drive Over Performance Parameter (P1), P2 provides more specific information on acceptable depth levels associated with potential sidewall aggression (i.e., the strength of the sidewall against protrusion). As such, the height (h) and depth (d) of the damage tool 125 is successively varied in order to determine the average depth of the damage tool 125 at which a given type of damaging event occurs in each test tire (T1). In one example, this value can be determined by fixing the damage tool at one or more predetermined height levels (for K total number of heights), and gradually incrementing the depth of the damage tool to determine when the damaging event occurs. Ultimately, the resultant depth values of the damage tool at which a given damaging event occurs for a given type of tire feature (j), averaged across all test tires (T1) and determined at a given height (k), is referred to herein as $d(T1_{j\_k})$. The $d(T1_{j\_k})$ values are determined as indicated in step 910 for all tire features (j=1, . . . , J) and all predetermined test heights (k=1, . . . , K). In addition, the respective characteristic dimensions ($a_j$) are measured in step 915 for each type of tire feature (j=1, . . . , J) for the plurality of test tires (T1), similar to step 815.

The total number of different heights (K) at which a depth damage value is obtained can vary from one to many. In one example, K=2 such that the above depth parameters $d(T1_{j\_k})$ are obtained for k=1 and k=2—i.e., $d(T1_{j\_1})$ and $d(T1_{j\_2})$ are determined. The values for the K different heights used in determining the Sidewall Strength Performance Parameter (P2) may also be specifically chosen. In some examples, at least one iteration of testing is performed while the height of the damage tool is fixed at the level of the tire rim (e.g., height 195 represented in FIG. 5.) This causes the damage tool to interact with the tire sidewall closer towards where the tire bead is seated on the rim. In other examples, the depth information is determined while the damage tool is at the lowest susceptible height identified in step 810 above—$h(T1_{j\_low})$. This means that some of the data required by process 900 could come from process 800, thus reducing the total amount of tire testing required. In other examples, testing is performed while the height of the damage tool is fixed at a height corresponding to the lowest susceptible height identified in step 810 above plus some predetermined value. In other words, $h(T1_{j\_k})$ for some $k = h(T1_{j\_low}) + y$, for some value of y (e.g., y=10 mm).

Once the depth values $d(T1_{j\_k})$ and characteristic dimension values $a_j$ for all types of tire features j=1, . . . , J are obtained at each test height k=1, . . . , K, per steps 905-915, a second performance score ($P2_{T1}$) that generally indicates the Sidewall Strength Performance for a tire can be electronically calculated in step 920 for the set of one or more test tires (T1). More particularly, the second performance score ($P2_{T1}$) for the plurality of test tires (T1) can be calculated by the following equation:

$$P2_{T1} = \frac{1}{\sum_{j=1}^{J} a_j} \left[ \sum_{j=1}^{J} \frac{a_j}{K} \left[ \sum_{k=1}^{K} d(T1_{j\_k}) \right] \right]. \quad (3)$$

In some embodiments of the above technology, the above parameter $P2_{T1}$ is more meaningful when compared with a reference value. In some embodiments, such a reference value may correspond to a predetermined threshold identified as an Acceptable score for P2. In other embodiments, such an reference value corresponds to a similar sidewall strength performance parameter determined for a second set of tires including one or more reference or comparison tires. In other words, it may be useful to compare the first performance score ($P2_{T1}$) to a similar performance score ($P2_{T2}$) for one or more reference tires (T2). In such instance, similar data obtained in steps 905-915 are obtained and averaged over all reference tires T2 having characteristic dimensions $b_j$ for all j=1, . . . , J such that $P2_{T2}$ can be calculated by:

$$P2_{T2} = \frac{1}{\sum_{j=1}^{J} b_j} \left[ \sum_{j=1}^{J} \frac{b_j}{K} \left[ \sum_{k=1}^{K} d(T2_{j\_k}) \right] \right]. \quad (4)$$

In one example, $P2_{T1}$ is related to $P2_{T2}$ by calculating a global P2 value ($P2_{global}$), where $P2_{global}=\Delta P2=P2_{T1}-P2_{T2}$. In another example, $P2_{T1}$ is related to $P2_{T2}$ by considering the percentage of the above $\Delta P2$ global score. In other words, $(P2_{global})=\Delta P2/P2_{T1}$.

An example of the measured values used to obtain the second performance parameter (P2) described relative to FIG. 9 is represented by part of the exemplary data set shown in FIGS. 6 and 7. Again, the open circular data points in FIGS. 6 and 7 represent measurements obtained for a first set of tires, test tires (T1). The solid circular data points in FIGS. 6 and 7 represent measurements obtained for a second set of tires, reference tires (T2).

In the example of FIGS. 6 and 7, the total number of tire features (J) is two. FIG. 6 illustrates data points (various height and depth combinations) for sidewall damage testing performed at a first type of tire feature—lugs (j=1), while FIG. 7 illustrates data points for sidewall damage testing performed at a second type of tire feature—voids (j=2). In addition, the total number of test heights (K) at which a damage value $d(T1_{j\_k})$ is obtained corresponds to two. In one example, the first test height (k=1) corresponds to the height of the rim (e.g., height 195 in FIG. 5), and the second test height (k=2) corresponds to the lowest susceptible height at which a test tire experiences damage $(T1_{j\_low})+y$, for some value of y (e.g., y=10 mm).

In particular, where j=1,2 and k=1,2, the data points measured in accordance with the particular example of FIGS. 6 and 7 correspond to $T1_{1\_2}$, $T1_{2\_2}$, $T1_{2\_1}$, and $T1_{2\_2}$ as well as $T2_{1\_2}$, $T2_{2\_2}$, $T2_{2\_1}$, and $T2_{2\_2}$. Again, the height and depth at each data point are typically available via sensing device 130 and position sensor 140 associated with testing apparatus 120. However, the values from FIG. 6 used in determining $P2_{T1}$ and $P2_{T2}$ will be $d(T1_{1\_1})$, $d(T1_{1\_2})$, $d(T2_{1\_1})$ and $d(T2_{1\_2})$. Similarly, the values from FIG. 7 used in determining $P2_{T1}$ and $P2_{T2}$ will be $d(T1_{2\_1})$, $d(T1_{2\_2})$, $d(T2_{2\_1})$ and $d(T2_{2\_2})$. Characteristic dimensions $a_1$ and $a_2$ are also measured so that the formula for P1 for the test tires (T1) can be determined from equation (3) above as:

$$P2_{T1} = \frac{1}{\sum_{j=1}^{J} a_j}\left[\sum_{j=1}^{J}\frac{a_j}{K}\left[\sum_{k=1}^{K}d(T1_{j\_k})\right]\right] = \frac{\frac{a_1}{2}[d(T1_{1\_1})+d(T1_{1\_2})]+\frac{a_2}{2}[d(T1_{2\_1})+d(T1_{2\_2})]}{a_1+a_2}.$$

Characteristic dimensions $b_1$ and $b_2$ are measured for the reference tires (T2), so that the formula for P2 for the reference tires ($P2_{T2}$) can be similarly determined from equation (4) above as:

$$P2_{T2} = \frac{1}{\sum_{j=1}^{J} b_j}\left[\sum_{j=1}^{J}\frac{b_j}{K}\left[\sum_{k=1}^{K}d(T2_{j\_k})\right]\right] = \frac{\frac{b_1}{2}[d(T2_{1\_1})+d(T2_{1\_2})]+\frac{b_2}{2}[d(T2_{2\_1})+d(T2_{2\_2})]}{b_1+b_2}.$$

A meaningful result might compare the test and reference tires by determining a parameter $P2_{global}=\Delta P2=P2_{T1}-P2_{T2}$.

In some embodiments of the present technology, it is also helpful to optionally provide one or more additional statistical parameters that help qualify the reliability of the exemplary performance parameters (e.g., P1 and P2). For example, the power of each test (Px) may be determined by the following formula:

$$\text{Power}_{Px} = 1-\beta = 1-\left[\frac{\zeta\sqrt{N}}{2*\sigma_{Px\,global}}-\frac{\alpha}{2}\right], \quad (5)$$

where $\zeta$ is the resolution of the test Px, $\alpha/2$ is the Type I error rate, $\beta$ is the Type II error rate, N is the total number of test tires (e.g., T1) and $\sigma_{Pxglobal}$ is the standard deviation of the calculated $Px_{global}$ parameter calculated across the N different test tires. The $\text{Power}_{Px}$ value can be reported to a user in order to provide the probability that the real difference in means is at least as big as the observed difference.

The power of the test can help a user determine whether or not the chosen sample size used in a study that determines the parameters P1 and/or P2 described herein is ideal or should be modified in the future. For example, the strength of the data used in determining such parameters can be relayed in part by two sources of information—the Type I Error rate and the Type II Error rate, respectively. The Type I error rate is the probability that one falsely concludes a statistical difference, say between two averages, when there really is no statistical difference in the averages. This is analogous to a false positive. The Type II error rate is the probability that one falsely concludes no statistical difference, say between two averages, when there really is a statistical difference in the averages. This is analogous to a false negative.

Figure 10:
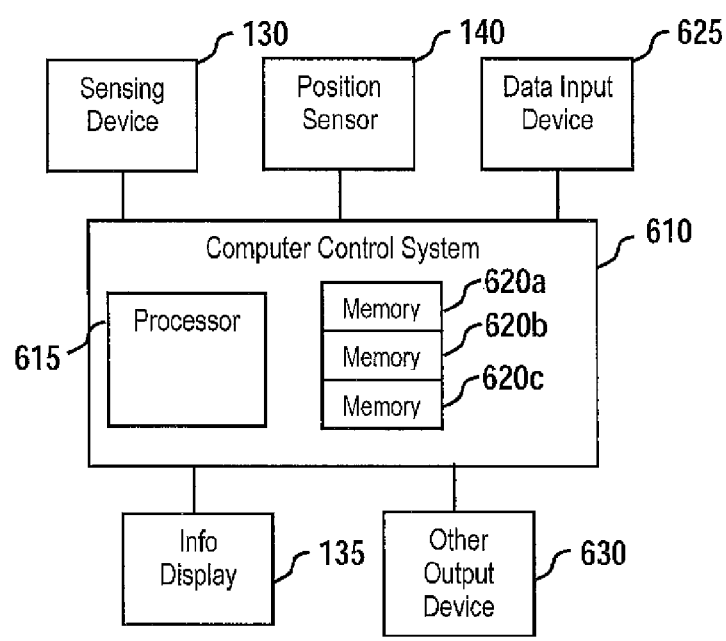
FIG. 10 provides a schematic block diagram of exemplary hardware components used for implementing selected steps of the present technology.

Referring now to FIG. 10, exemplary apparatuses that may be used to implement various aspects of the disclosed methodology are now disclosed. It should be evident from the present disclosure that the subject methods are tied to a testing apparatus such as apparatus 120 shown in FIGS. 1 and 5. Specific components within apparatus 120 may provide electronic data that are used for subsequent electronic calculations. For example, the sensing device 130 and position sensor 140 may provide electronic data indicating the respective height and depth coordinates for different data points in a test procedure. Such electronic data may be relayed to a computer control system 610 for subsequent analysis in accordance with the steps disclosed herein. Any other additional data required for electronic processing (e.g., characteristic dimensions for each tire or set of tires, identification parameters, or other variables) may be provided to computer control system 610 via data input device 625. Exemplary input devices may include but are not limited to a keyboard, touch-screen monitor, microphone, mouse and the like.

Computer control system 610 generally may include such components as at least one memory/media element or database for storing data and software instructions as well as at least one processor. In the particular example of FIG. 10, a processor(s) 615 and associated memory/media elements 620a, 620b and 620c are configured to perform a variety of computer-implemented functions (i.e., software-based data services), including the electronic calculation of the performance parameters described herein. At least one memory/media element (e.g., element 620b in FIG. 10) is dedicated to storing software and/or firmware in the form of computer-readable and executable instructions that will be implemented by the one or more processor(s) 615. Other memory/ media elements (e.g., memory/media elements 620a, 620c) are used to store data which will also be accessible by the processor(s) 615 and which will be acted on per the software instructions stored in memory/media element 620b. As such, computing/processing device(s) 615 may be adapted to operate as a special-purpose machine by executing the software instructions rendered in a computer-readable form stored in memory/media element 620b. When software is used, any suitable programming, scripting, or other type of language or combinations of languages may be used to implement the teachings contained herein. In other embodiments, the methods disclosed herein may alternatively be implemented by hard-wired logic or other circuitry, including, but not limited to application-specific circuits.

The various memory/media elements of FIG. 10 may be provided as a single or multiple portions of one or more varieties of non-transitory computer-readable media, such as but not limited to any combination of volatile memory (e.g., random access memory (RAM, such as DRAM, SRAM, etc.) and nonvolatile memory (e.g., ROM, flash, hard drives, magnetic tapes, CD-ROM, DVD-ROM, etc.) or any other memory devices including diskettes, drives, other magnetic-based storage media, optical storage media and others. Although FIG. 10 shows three separate memory/media elements 620a, 620b and 620c, the content dedicated to such devices may actually be stored in one memory/media element or in multiple elements, any such possible variations and other variations of data storage will be appreciated by one of ordinary skill in the art.

In one particular embodiment of the present subject matter, a first portion of memory/media 620a is configured to store input data for the subject sidewall performance parameter determination methods. Input data stored in memory/media element 620a may include raw measurement data obtained from sensing device 130 and position sensor 140 associated with apparatus 120 as well as characteristic dimensions measured for the various test tires. Second memory element 620b includes computer-executable software instructions that can be read and executed by processor(s) 615 to act on the data stored in memory/media element 620a to create new output data (e.g., performance parameters, alarm signals, graphical outputs and/or control signals for improving or modifying a set of tires) for storage in a third memory/media element 620c. Such output data may be provided to info display 135 or to another peripheral output device 630, such as monitor, printer or other device for visually depicting the output data, or as control signals to still further components.

Additional steps subsequent to the calculation of performance parameters via the system of FIG. 10 include sorting or grading tires based on the determined performance parameters, modifying a tire by grinding, removing mass or adding mass to a tire, and/or changing one or more steps in the manufacturing process of a tire to improve the tires in response to the determined performance parameters.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. For example, an exemplary method of the present invention has been described in which the vehicle was driven in reverse over a damage tool. However, the test could be performed driving the vehicle in a forward gear as well. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A method for testing the resistance of a tire to sidewall damage, comprising:
rolling a test tire along a longitudinal travel path that extends past a damage tool such that the test tire passes by the damage tool as the test tire rolls along the longitudinal travel path, wherein the height of the damage tool along a vertical direction relative to the test tire is selectively positionable, and where the damage tool is selectively movable along a lateral direction that is orthogonal to the longitudinal travel path;
subjecting the test tire to contact with a damage tool by advancing the damage tool along the lateral direction and into the longitudinal travel path of the test tire;
measuring the lowest height of the damage tool at which a given type of damaging event occurs in the test tire; and
calculating a first performance parameter based in part on the measured lowest height of the damage tool at which the given type of damaging event occurs in the test tire.

2. A method for testing the resistance of a tire to sidewall damage as in claim 1, wherein said rolling, subjecting, measuring and calculating are repeated such that the damage tool interacts with different types of tire features present along the sidewall of the test tire, and wherein said first performance parameter is based at least in part on each measured lowest height of the damage tool at which the given type of damaging event occurs in the test tire for each different type of tire feature.

3. A method for testing the resistance of a tire to sidewall damage as in claim 2, further comprising a step of measuring a characteristic dimension $a_j$ for each different type of tire feature (j=1, ... ,J) and wherein the first performance parameter is further based in part on the measured characteristic dimensions.

4. A method for testing the resistance of a tire to sidewall damage as in claim 3, wherein the total number J of tire features is two or more, and wherein at least one type of tire feature corresponds to a lug and at least one type of tire feature corresponds to a groove.

5. A method for testing the resistance of a tire to sidewall damage as in claim 3, wherein the first performance parameter for the test tire ($P1_{T1}$) is determined by the formula $$P1_{T1} = \frac{1}{\sum_{j=1}^{J} a_j} \left[ \sum_{j=1}^{J} a_j h(T1_{j\_low}) \right],$$

where $h(T1_{j\_low})$ is the measured lowest height of the damage tool at which the given type of damaging event occurs at each tire feature j within the test tire (T1).

6. A method for testing the resistance of a tire to sidewall damage as in claim 1, wherein the given type of damaging event comprises one or more of puncture, rupture, splitting and cutting of the test tire.

7. A method for testing the resistance of a tire to sidewall damage as in claim 1, wherein said subjecting and measuring steps are repeated for a plurality of test tires, and wherein the first performance parameter is calculated as an average value across all test tires.

8. A method for testing the resistance of a tire to sidewall damage as in claim 1, further comprising a step of relating the first performance parameter to a reference value.

9. A method for testing the resistance of a tire to sidewall damage as in claim 8, wherein said reference value comprises a threshold value or a value similar to the first performance parameter calculated for one or more reference tires.

10. A method for testing the resistance of a tire to sidewall damage as in claim 1, further comprising providing the calculated first performance parameter as output to a user.

11. A method for testing the resistance of a tire to sidewall damage as in claim 1, wherein damaging event is selected from the group consisting of cutting the tire, puncturing the tire, rupturing the tire, or splitting the tire.

12. A method for testing the resistance of a tire to sidewall damage as in claim 1, wherein the test tire is positioned on a vehicle during the rolling.

13. A method for testing the resistance of a tire to sidewall damage as in claim 1, wherein the longitudinal travel path extends linearly past the damage tool.

14. A method for testing the resistance of a tire to sidewall damage as in claim 1, wherein the longitudinal travel path is defined by a pair of parallel rails.

15. A method for testing the resistance of a tire to sidewall damage, comprising:
rolling a test tire along a longitudinal travel path that extends past a damage tool;
moving the tire past the damage tool as the test tire rolls along the longitudinal travel path, wherein the height of the damage tool along a vertical direction relative to the test tire is selectively positionable, and where the damage tool is selectively movable along a lateral direction that is orthogonal to the longitudinal travel path;
subjecting the test tire to contact with a damage tool by advancing the damage tool along the lateral direction and into the longitudinal travel path of the test tire until the tire is damaged by a damaging event;
measuring the depth of the damage tool at which the damaging event occurs in the test tire while the damage tool is fixed at one or more predetermined heights (k); and
calculating a second performance parameter based at least in part on the measured depth of the damage tool at which the given type of damaging event occurs in the test tire (T1) at each of the one or more predetermined heights (k).

16. A method for testing the resistance of a tire to sidewall damage as in claim 15, wherein said rolling, subjecting, measuring and calculating are repeated such that the damage tool interacts with different types of tire features present along the sidewall of the test tire, and wherein said second performance parameter is based at least in part on each measured depth of the damage tool at which the damaging event occurs in the test tire for each different type of tire feature (j=1, . . . ,J) and for each of the one or more predetermined heights (k=1, . . . ,K).

17. A method for testing the resistance of a tire to sidewall damage as in claim 16, further comprising a step of measuring a characteristic dimension $a_j$ for each different type of tire feature (j=1, . . . ,J), and wherein the second performance parameter is further based in part on the measured characteristic dimensions.

18. A method for testing the resistance of a tire to sidewall damage as in claim 17, wherein the second performance parameter for the test tire ($P2_{T1}$) is determined by the formula $$P2_{T1} = \frac{1}{\sum_{j=1}^{J} a_j} \left[ \sum_{j=1}^{J} \frac{a_j}{K} \left[ \sum_{k=1}^{K} d(T1_{j\_k}) \right] \right],$$

where $d(T1_{j\_k})$ is the measured depth of the damage tool at which the damaging event occurs at each of the one or more predetermined heights (k=1, . . . ,K) and for each tire feature (j=1, . . . ,J) within the test tire (T1).

19. A method for testing the resistance of a tire to sidewall damage as in claim 16, wherein the total number J of tire features is two or more, and wherein at least one type of tire feature corresponds to a lug and at least one type of tire feature corresponds to a groove.

20. A method for testing the resistance of a tire to sidewall damage as in claim 16, wherein the total number K of predetermined heights is two or more, and wherein at least one of the predetermined heights corresponds to the height of a rim on which the test tire is mounted.

21. A method for testing the resistance of a tire to sidewall damage as in claim 15, wherein the damaging event comprises one or more of puncture, rupture, splitting and cutting of the test tire.

22. A method for testing the resistance of a tire to sidewall damage as in claim 15, wherein said subjecting and measuring steps are repeated for a plurality of test tires, and wherein the second performance parameter is calculated as an average value across all test tires.

23. A method for testing the resistance of a tire to sidewall damage as in claim 15, further comprising a step of relating the second performance parameter to a reference value.

24. A method for testing the resistance of a tire to sidewall damage as in claim 23, wherein said reference value comprises a threshold value or a value similar to the second performance parameter calculated for one or more reference tires.

25. A method for testing the resistance of a tire to sidewall damage as in claim 15, wherein damaging event is selected from the group consisting of cutting the tire, puncturing the tire, rupturing the tire, or splitting the tire.

* * * * *